United States Patent
Zhou et al.

(10) Patent No.: US 7,535,517 B2
(45) Date of Patent: May 19, 2009

(54) METHOD OF MOTION COMPENSATED TEMPORAL NOISE REDUCTION

(75) Inventors: Zhi Zhou, Irvine, CA (US); Yeong-Taeg Kim, Irvine, CA (US); Gonzalo R. Arce, Newark, DE (US)

(73) Assignee: Samsung Electronics Co., Ltd., Suwon (KR)

( * ) Notice: Subject to any disclaimer, the term of this patent is extended or adjusted under 35 U.S.C. 154(b) by 507 days.

(21) Appl. No.: 11/106,998

(22) Filed: Apr. 14, 2005

(65) Prior Publication Data
US 2006/0232712 A1    Oct. 19, 2006

(51) Int. Cl.
*H04N 5/00*    (2006.01)
*H04N 5/14*    (2006.01)

(52) U.S. Cl. .................. 348/701; 348/607; 348/620; 348/699

(58) Field of Classification Search .......... 348/620, 348/618–619, 607, 622, 701, 615, 699–700, 348/407; 382/265, 260–261, 236, 107, 275, 382/280
See application file for complete search history.

(56) References Cited

U.S. PATENT DOCUMENTS

| 4,639,784 | A | * | 1/1987 | Fling | 348/620 |
| 5,500,685 | A | * | 3/1996 | Kokaram | 348/620 |
| 5,909,515 | A | * | 6/1999 | Makram-Ebeid | 382/260 |
| 6,259,489 | B1 | * | 7/2001 | Flannaghan et al. | 348/620 |

OTHER PUBLICATIONS

U.S. Appl. No. 11/025,173, filed Dec. 29, 2004, Z. Zhou et al.
U.S. Appl. No. 11/110,336, filed Apr. 19, 2005, Z. Zhou et al.
M.Lysaker, S. Osher, and X.C. Tai, *Noise Removal Using Smoothed Normals and Surface Fitting*, IEEE trans. on image processing, Oct. 2004, pp. 1345-1357, vol. 13, No. 10.
A.B. Hamza and H. Krim, *Image Denoising: A Nonlinear Robust Statistical Approach*, IEEE trans. on signal processing, Dec. 2001, pp. 3045-3054, vol. 49, No. 12.

* cited by examiner

*Primary Examiner*—Trang U Tran
(74) *Attorney, Agent, or Firm*—Kenneth L. Sherman, Esq.; Michael Zarrabian, Esq.; Myers Andras Sherman LLP

(57) ABSTRACT

A method of reducing noise in a sequence of digital video frames is performed by motion estimation between a current noisy frame and a previous noise-reduced frame, to generate motion vectors indicating relative motion between the pixels in the current noisy frame and the corresponding pixels in the previous noise-reduced frame; and removing noise from the current noisy frame by computing the weighted average of pixels in the current noise frame and the corresponding pixels in the previous noise-reduced frame based on the motion vectors, to generate a noise-reduced output frame.

12 Claims, 8 Drawing Sheets

400

METHOD OF MOTION COMPENSATED TEMPORAL NOISE REDUCTION

FIELD OF THE INVENTION

The present invention relates generally to video processing, and more particularly to noise reduction in video sequences.

BACKGROUND OF THE INVENTION

In TV systems, the first stage of video enhancement generally is noise reduction in order to obtain noise-free video sequences. Various noise reduction methods have been developed but few of them are used in real products due to the artifacts. Most of the noise reduction methods can be classified into three categories: (1) spatial (2D) noise reduction, (2) temporal noise reduction, and (3) 3D noise reduction. The 3D noise reduction is a combination of 2D and temporal noise reduction.

Spatial noise reduction applies a filter of a small local window on every pixel of the current video frame. Such a filter usually is regarded as a convolution filter based on a kernel. The most common filters are the mean filter, the Gaussian filter, the median filter, the sigma filter, etc. Mean filtering is the simplest method of smoothing images and reducing noise by taking the mean of a small local window as the filtered result. Generally, a 3×3 square kernel is used, and as such it is simple to implement. Mean filtering, however, causes severe blurring of images.

Gaussian filtering uses a "bell-shaped" kernel to remove noise. Gaussian filtering equivalently is a weighted average operation of the pixels in a small local window. However, Gaussian filtering also introduces blurring, but the severeness can be controlled by the standard deviation of the Gaussian.

Median filtering is a nonlinear method that sorts the pixels in a small local window and takes the median as the filtered result. Median filtering does not create new unrealistic pixel values, and preserves sharp edges. Also, an aliasing pixel value does not affect the filtered result. However, as the number of input pixels increases, the computational cost of sorting is also increases, making it costly to implement practically.

To address the problem of blurring, some edge-oriented spatial filtering algorithms have been developed. Such algorithms, however, require expensive hardware and introduce artifacts when edge-detection fails, especially in very noisy images. Other algorithms convert images into frequency domain and reduce the high frequency components. Since image details are also high frequency components, such methods also blur the image.

Temporal noise reduction first examines motion information among the current video frame and its neighboring frames. It classifies pixels into motion regions and non-motion regions. In a non-motion region, a temporal filter is applied to the pixels in the current frame and its neighboring frames along the temporal axis. In a motion region, the temporal filter is switched off to avoid motion blurring. Generally, temporal noise reduction is better in keeping the details and preserving edges than spatial noise reduction.

One such conventional temporal noise reduction method is applied to two frames: (1) one frame is the current input noisy frame, and (2) the other frame is the previous filtered frame. Once the current frame is filtered, it is saved into memory for filtering the next incoming frame. Motion and non-motion regions between the two frames are examined. In a non-motion region, pixels are filtered along the temporal axis based on the Maximum Likelihood Estimation, outputting high quality filtered images, but with a drawback of unevenness, caused by switching off temporal filtering in motion regions. For example, some unfiltered regions close to the moving objects appear as noisy tailing. To overcome this problem, a bidirectional temporal noise reduction has been utilized, which filters the motion region in either forward direction or backward direction to remove the tailing effects. However, such a method requires more frame buffer and frame delay. Further, such a method cannot perform temporal noise reduction on a moving object.

BRIEF SUMMARY OF THE INVENTION

The present invention addresses the above shortcomings. An object of the invention is to provide a motion compensated temporal noise reduction system. In one embodiment, the present invention provides a method of reducing noise in a sequence of digital video frames is performed by applying motion estimation between a current noisy frame and a previous noise-reduced frame, to generate motion vectors indicating relative motion between the pixels in the current noisy frame and the corresponding pixels in the previous noise-reduced frame; and removing noise from the current noisy frame by computing the weighted average of pixels in the current noise frame and the corresponding pixels in the previous noise-reduced frame based on the motion vectors, to generate a noise-reduced output frame.

In another embodiment the present invention provides a noise reduction system for reducing noise in a sequence of digital video frames, comprising: a motion estimator that estimates motion between a current noisy frame $g_t$ at time t and a previous noise-reduced frame $\hat{g}_{t-1}$, to generate motion vectors, such that for a pixel $g_t(i,j)$ in the frame $g_t$, where $(i,j)$ denotes the coordinates of that pixel, if the motion vector is $(dy,dx)$, the corresponding matching pixel in the previous noise-reduced frame $\hat{g}_{t-1}$ is $\hat{g}_{t-1}(i+dy,j+dx)$; and a noise reducer that removes noise from the current noisy frame by computing the weighted average further includes the steps of computing the weighted average of the pixel $g_t(i,j)$ in the frame $g_t$ and the pixel $\hat{g}_{t-1}(i+dy,j+dx)$ in the frames $\hat{g}_{t-1}$ to generate the noise-reduced output frame $\hat{g}_t$.

Other embodiments, features and advantages of the present invention will be apparent from the following specification taken in conjunction with the following drawings.

DETAILED DESCRIPTION OF THE INVENTION

Preferred embodiments of the present invention are now described in conjunction with the drawings. In one embodiment, the present invention provides a motion compensated temporal noise reduction method and system. In order to systematically describe the temporal noise reduction problem and said embodiment of the present invention, let $g_t$ denote the incoming video frame at time instant t and $g_t(i,j)$ denote the corresponding pixel value at the coordinates (i,j) where i represents the ordinate and j represents the abscissa. Assume the input video sequence is corrupted by independent, identically distributed additive and stationary zero-mean Gaussian noise with variance $\sigma_0^2$, that is, any pixel $g_t(i,j)$ can be denoted as:

$$g_t(i,j) = f_t(i,j) + n_t(i,j),$$

where $f_t(i,j)$ denotes the true pixel value without noise corruption and $n_t(i,j)$ is the Gaussian distributed noise component.

The noise variance $\sigma_0^2$ can be pre-detected by a noise estimation unit. Commonly assigned patent application Ser. No. 10/991,265 for "Methods to estimate noise variance from a video sequence", incorporated herein by reference, provides examples of such a noise estimation unit.

Based upon the description of the video signal, the noise reduction problem can be stated as a process of removing the corrupted noise from the video sequence. That is, for any pixel $g_t(i,j)$, the noise reduction process involves removing the noise component $n_t(i,j)$ and estimating the true pixel value $f_t(i,j)$. The estimated value is denoted as $\hat{g}_t(i,j)$ and the noise reduced frame is denoted as $\hat{g}_t$.

Figure 1:
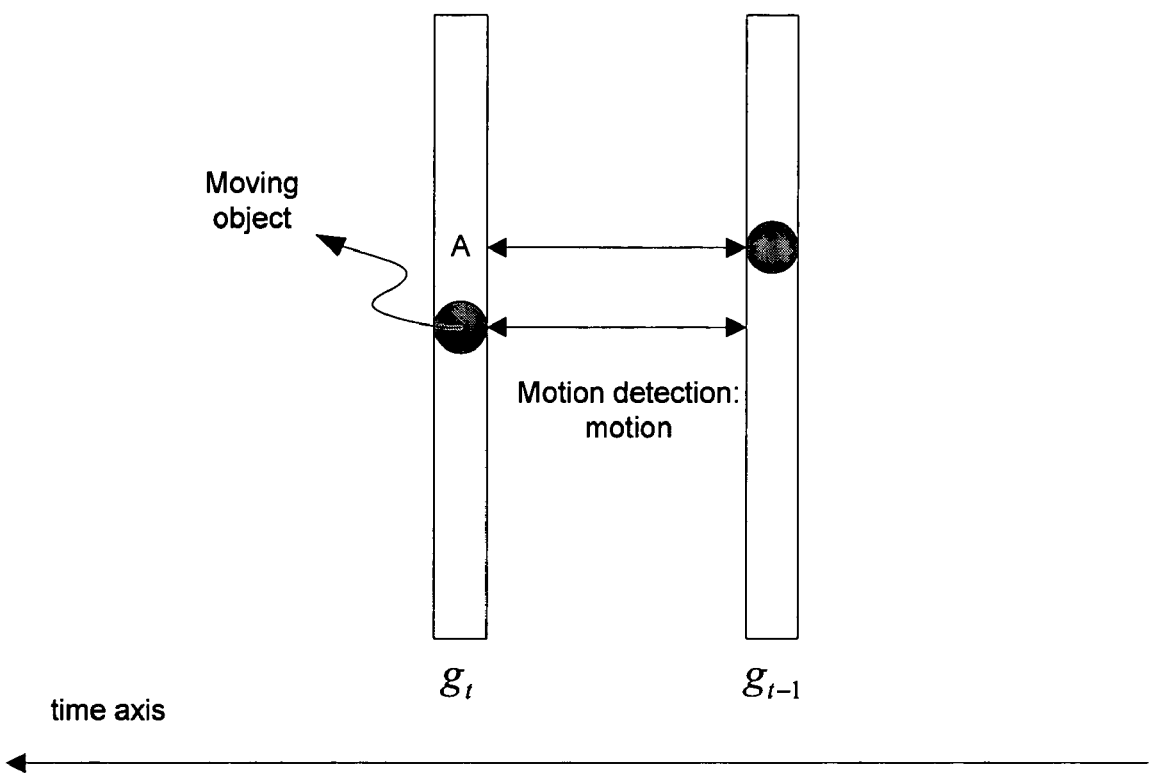
FIG. 1 shows a pictorial description of uneven noise reduction in conventional temporal noise reduction.
Figure 2:
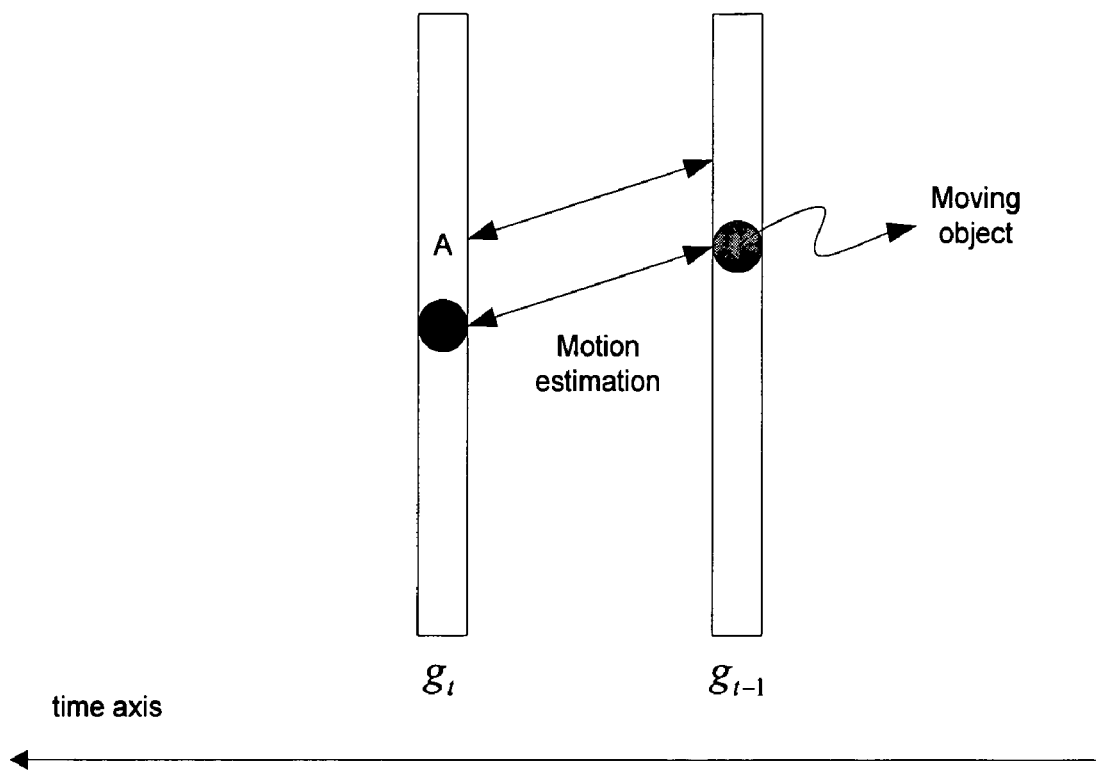
FIG. 2 shows an embedment of motion compensated method that reduces uneven noise reduction according to an embodiment of the present invention.

Referring to FIG. 1, as mentioned, a conventional temporal noise reduction first performs motion detection between neighboring frames. Then the pixels in non-motion region are filtered along temporal axis to remove the noise. This method causes uneven noise reduction as shown in the field 100 of FIG. 1. Specifically, in filtering the current frame $g_t$, a region A and the moving object in FIG. 1 are detected as motion region, such that, they are not filtered in such temporal noise reduction. When the filtered video is displayed, region A appears as noisy tailing following a noisy moving object. However, if the motion vectors of region A and the moving object can be precisely estimated, they can be filtered using a motion compensated temporal noise reduction method according to the present invention as shown by an example field 200 in FIG. 2, wherein the need for an extra frame buffer, and frame delay, are eliminated.

Figure 3:
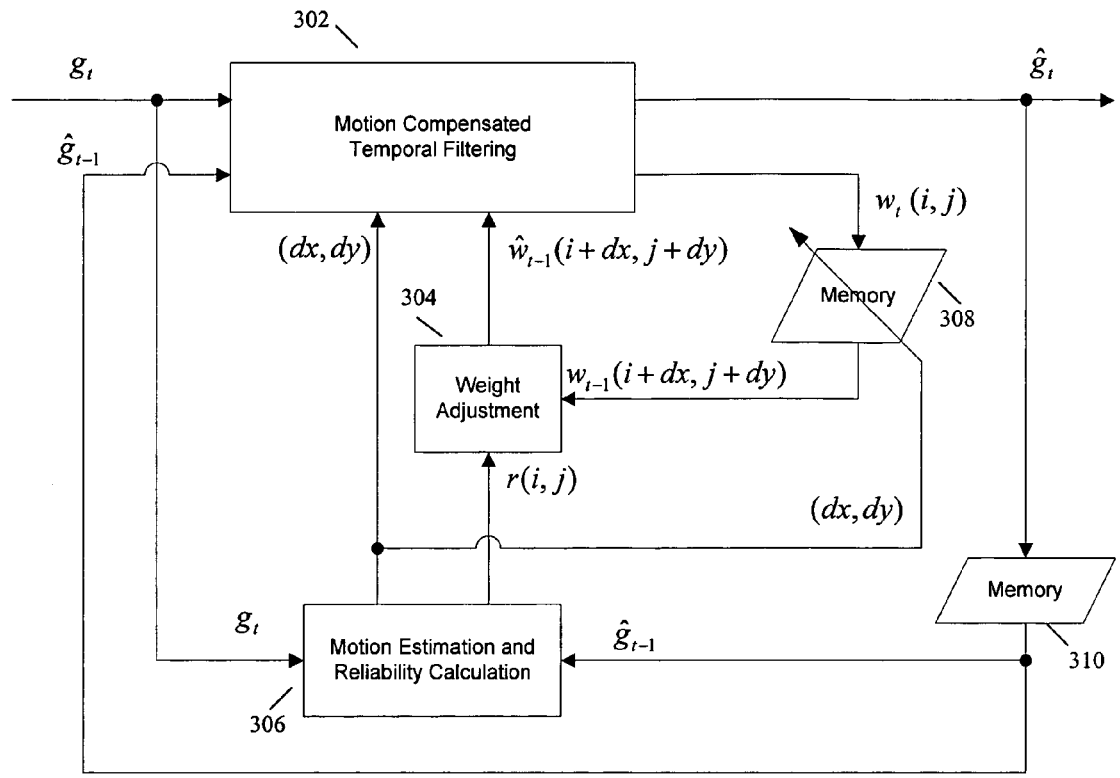
FIG. 3 shows a block diagram on a motion compensated noise reduction system according to an embodiment of the present invention.

FIG. 3 shows a block diagram of an example system 300 which implements a motion compensated temporal noise reduction according to an embodiment the present invention. The system 300 comprises a motion compensated temporal filtering unit 302, a weight adjustment unit 304, a motion estimation and reliability calculation unit 306, and memories 308 and 310. In the system 300, motion estimation is performed by the unit 302 between the current frame $g_t$ and the previous filtered frame $\hat{g}_{t-1}$. Such motion estimation can also be performed between the current frame $g_t$ and the previous frame $g_{t-1}$, but using the current frame $g_t$ and the previous filtered frame $\hat{g}_{t-1}$ saves one frame buffer. There is no restriction as to motion estimation method is used. An implementation of an extended motion estimation is described below.

The extended motion estimation uses block matching techniques and can search fast motions. For each block in the current frame $g_t$, the block matching method searches the most similar block in the previous filtered frame $\hat{g}_{t-1}$ (or the previous frame $g_{t-1}$). The displacement between the two blocks is called a motion vector herein.

Figure 4:
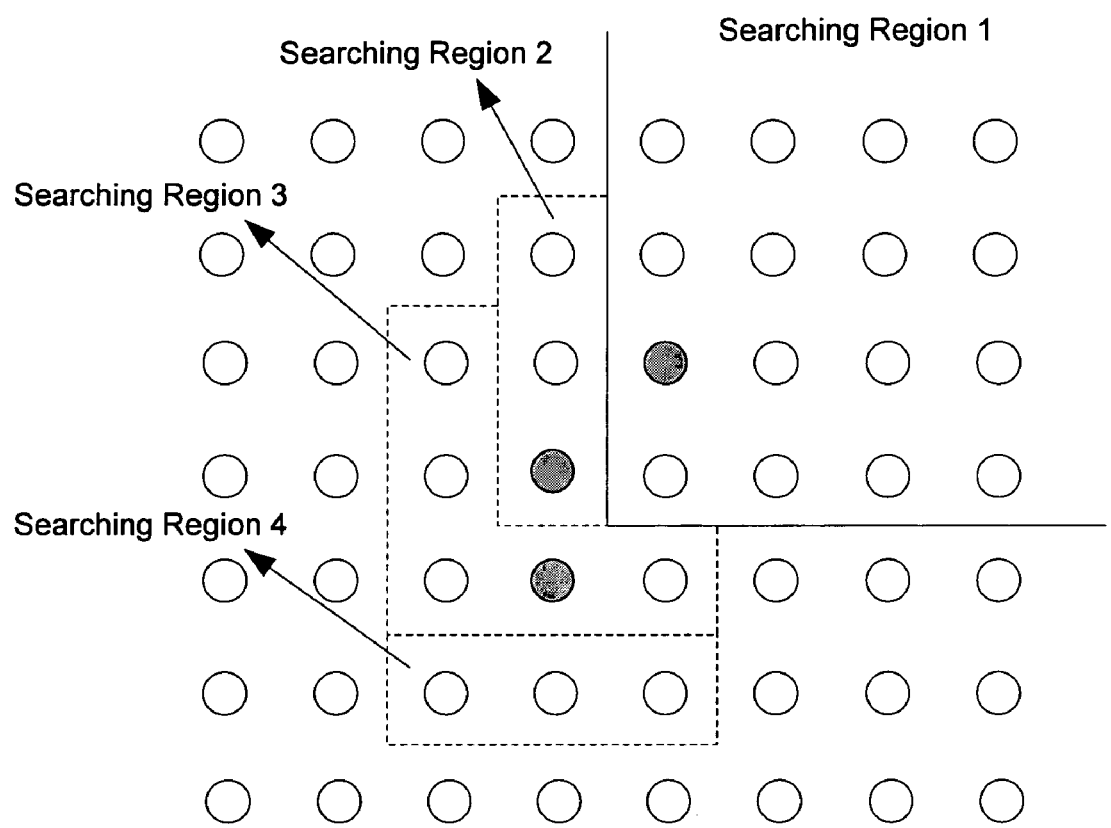
FIG. 4 shows an example of extended motion estimation according to an embodiment of the present invention.

Now also referring to the example pixel field 400 in FIG. 4, as the first step of the extended motion estimation, a searching method (e.g., full searching, three step searching, logarithmic searching etc.), is used to search the motion vector of a block in a certain searching region, such as the Search Region 1 in FIG. 4. If the best matching position found by the search is close to the edge of the searching region, such as the marked pixel shown by the filled circle (•) in the Search Region 1, a new local searching with smaller searching distance around the matching position is performed.

To determine if a matching position is close to the edge of the searching region, the distance between the matching position and the edge is compared to a threshold. If that distance is less than the threshold, the matching position is close to the edge, otherwise, it is not. Because the matching position is located on the edge, a part of the local searching region is overlapped with the previous searching region, and another part of it is beyond the previous searching region. Only the motion vector in the non-overlapped region, such as the Searching Region 2, needs to be searched because the overlapped region is already searched in the first step. If a better matching position is found in the local searching region, such as the filled circle (•) in the Search Region 2, another local search is performed around the new matching position. That process is iterated until no better matching position is found in the new local searching region. For example, a matching position shown as a filled circle (•) is found in the Searching Region 3 but no better matching position is found in the Searching Region 4, such that the final matching position is the filled circle (•) in the Searching Region 3. This method can search larger motion vectors as well as regular ones. It does not matter which block searching method or matching criteria is used in each step.

Figure 5:
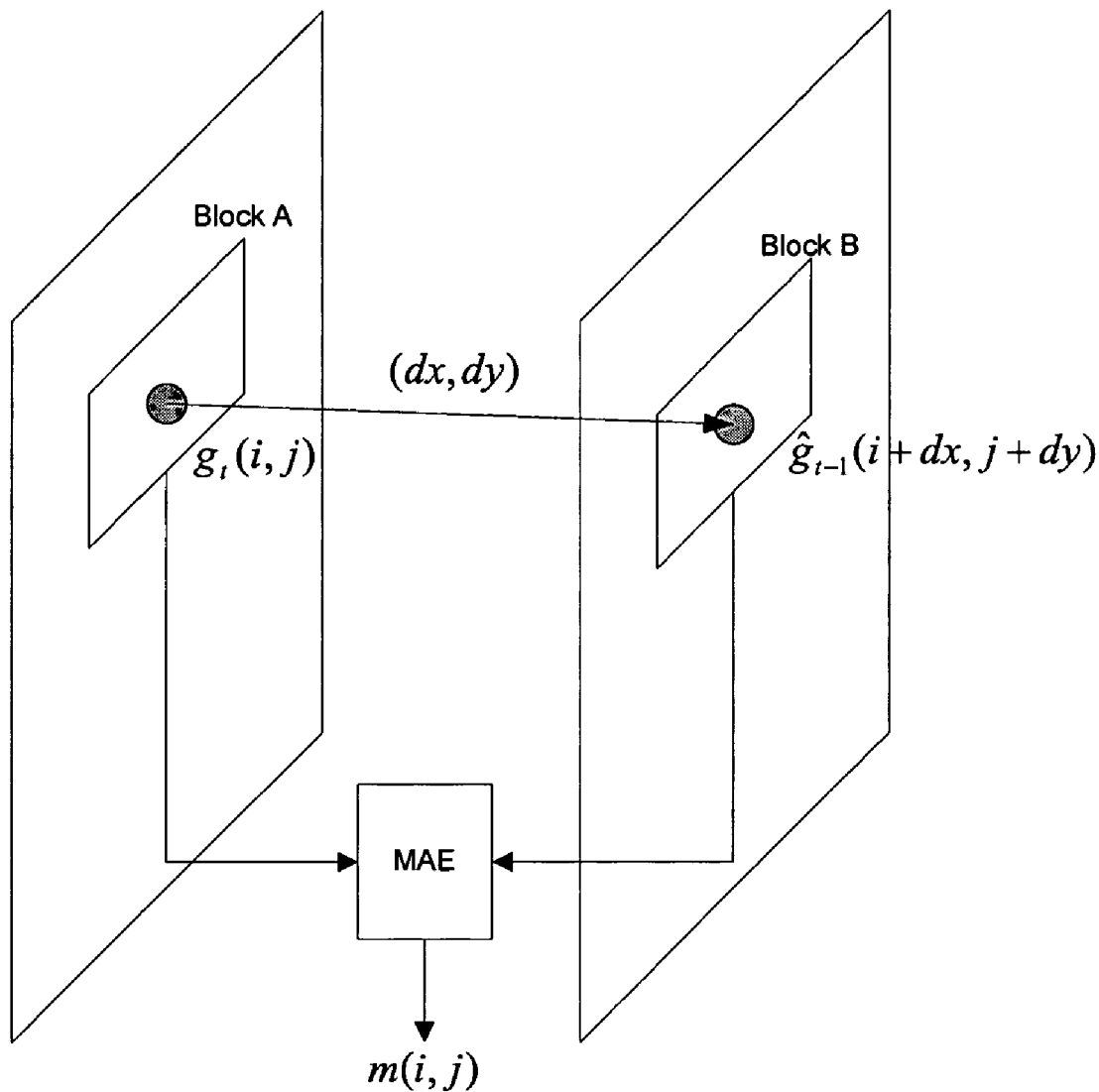
FIG. 5 shows an example of determining mean absolute error of two pixel blocks centered at two matching pixels, according to an embodiment of the present invention.

Now assume all the pixels in a block share the same motion vector. Then the motion estimation and reliability calculation unit 306 (FIG. 3) estimates if that is the true motion vector for each pixel (i.e., reliability of the motion vector is estimated). Referring to the example 500 in FIG. 5, assume the motion vector of pixel $g_t(i,j)$ is (dy,dx), such that the corresponding matching pixel in the previous filtered frame is $\hat{g}_{t-1}(i+dy, j+dx)$. Two blocks A and B centered at the two pixels, respectively, are extracted and the mean absolute error m(i,j) between the two blocks A and B is calculated by an MAE unit. The reliability r(i,j) of the motion vector for pixel $g_t(i,j)$ can be obtained from the mean absolute error m(i,j). For example, let the reliability value $r(i,j) \in [0,1]$. The larger the value r(i,j), the more reliable the motion vector (dy,dx). A smaller value m(i,j) indicates better matching, so that the motion vector (dy,dx) is more reliable for pixel $g_t(i,j)$.

Figure 6A:
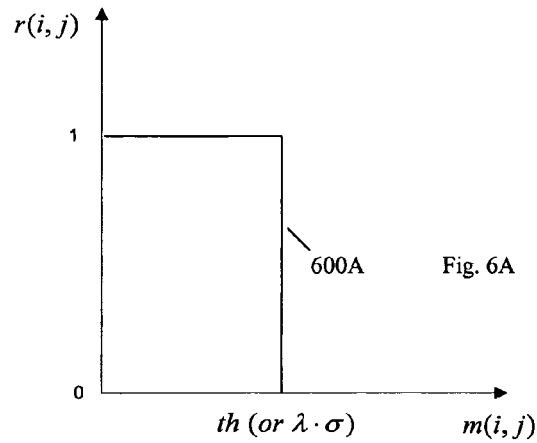
FIGS. 6A-F show example calculations of reliability of a motion vector, according to an embodiment of the present invention.
Figure 6B:
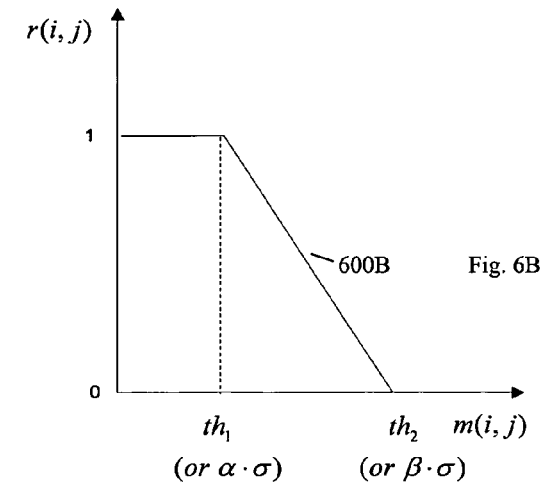
Figure 6C:
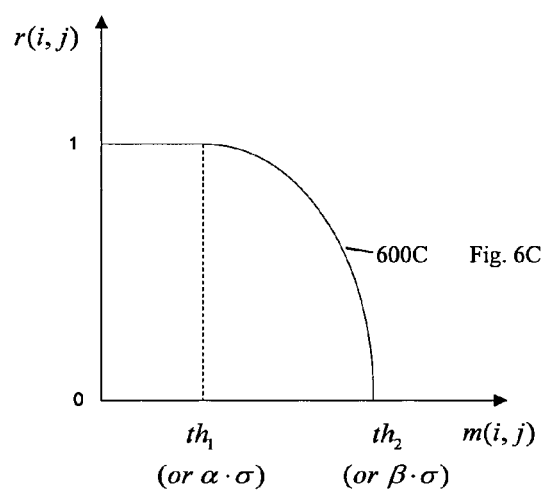
Figure 6D:
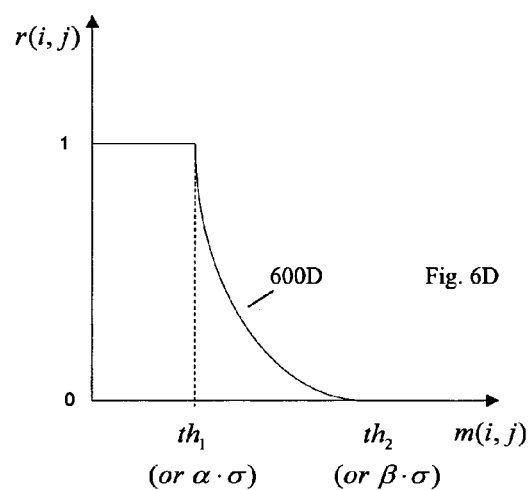
Figure 6E:
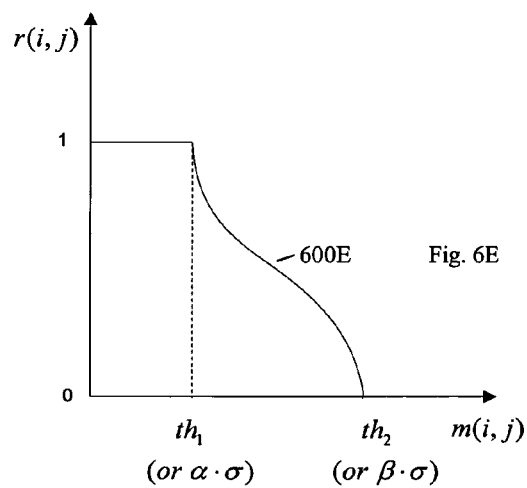
Figure 6F:
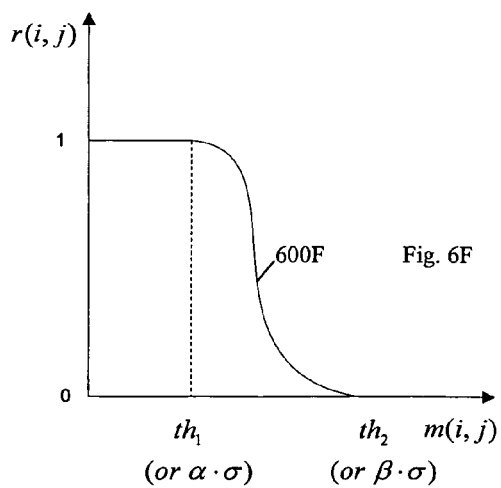

FIGS. 6A-F shows six examples of computing the reliability value r(i,j) based on the mean absolute error m(i,j). The example graph 600A in FIG. 6A is computation of a hard-switching (binary) value. The mean absolute error m(i,j) is compared with a threshold th. If m(i,j) is smaller than the threshold, then the motion vector (dy,dx) is reliable (i.e., r(i,j)=1); otherwise, the motion vector (dy,dx) is not reliable (i.e., r(i,j)=0). This method is extended to compute soft-switching (any value in [0,1]) values 600B-F as shown in FIGS. 6B-F, respectively.

A soft-switching value often provides much smoother reliability information. If FIGS. 6B-F, if the mean absolute error m(i,j) is smaller than a threshold $th_1$, then the motion vector (dy,dx) is reliable (i.e., r(i,j)=1). If the mean absolute error m(i,j) it is larger than a second threshold $th_2$, then the motion vector (dy,dx) is not reliable (i.e., r(i,j)=0). If the mean absolute error m(i,j) is in the middle of $th_1$ and $th_2$, the reliability value r(i,j) can be linearly interpolated as shown by example in FIG. 6B, or non-linearly interpolated as shown by examples in FIGS. 6C-F. There is no restriction on how to compute the reliability value, as long as it is a monotonically decreasing function of the mean absolute error m(i,j).

Let the manually set or pre-detected noise variance of the current frame be $\sigma^2$. The reliability value calculation can be extended to a noise-adaptive method. Let the threshold value (s) in FIGS. 6A-F be a product of a constant value (such as $\lambda$, $\alpha$ and $\beta$ in FIGS. 6A-F) with the noise standard deviation. In that case, the obtained reliability value is more robust against noise because of automatic (i.e., adaptive) adjustment of the threshold value(s) as a function of noise. Note that, in this example, both the mean absolute error calculation and the reliability value calculation are pixel-wise.

To remove the noise in pixel $g_t(i,j)$, the weighted average of pixels $g_t(i,j)$ and $\hat{g}_{t-1}(i+dy,j+dx)$ can be computed as the filtered output. If the motion vector is not reliable, the filtered pixel $\hat{g}_t(i,j)$ should equal to the original value $g_t(i,j)$ to avoid blurring (e.g., weights 1 and 0 are applied to pixels $g_t(i,j)$ and $\hat{g}_{t-1}(i+dy,j+dx)$, respectively). If the motion vector is reliable, an optimal filtering method known to those skilled in the art can be extended to a motion compensated method.

Figure 7:
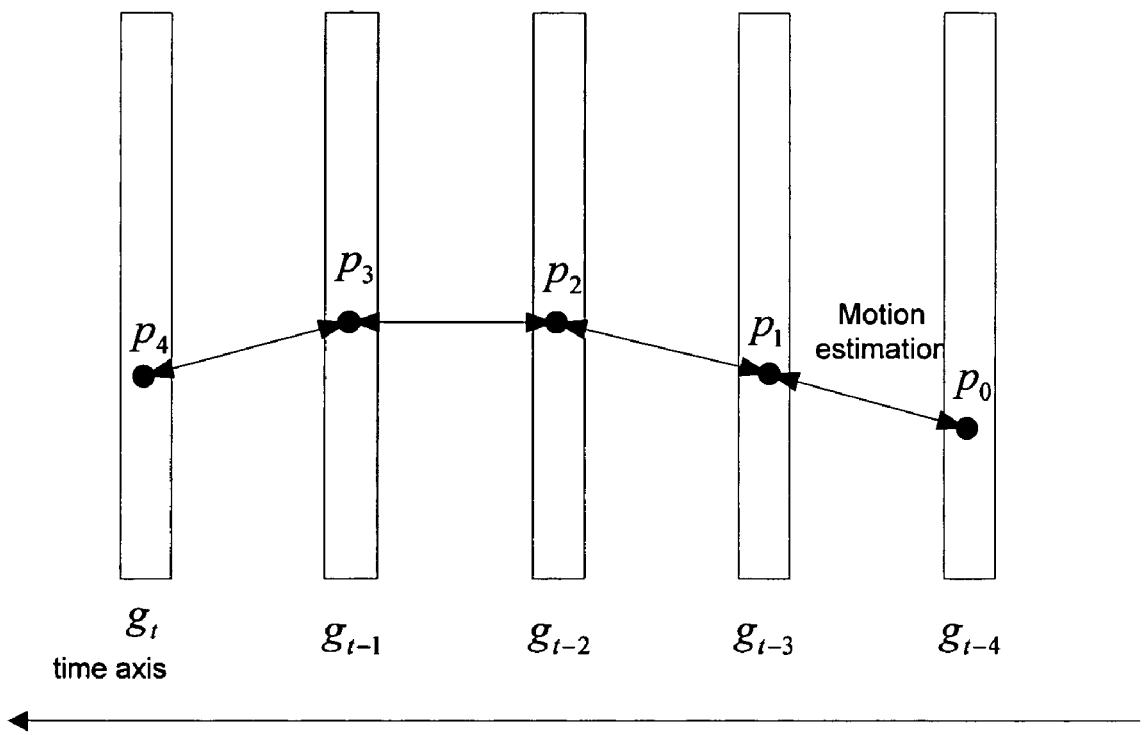
FIG. 7 shows an example of tracking a pixel along the temporal direction according to an embodiment of the present invention.
Figure 8A:
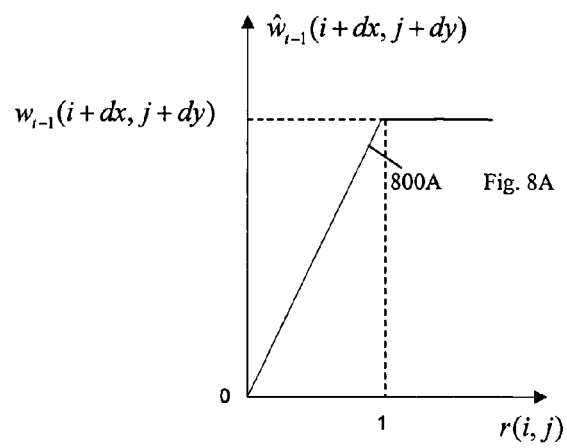
FIGS. 8A-D show examples of weight adjustment calculations according to the present invention.
Figure 8B:
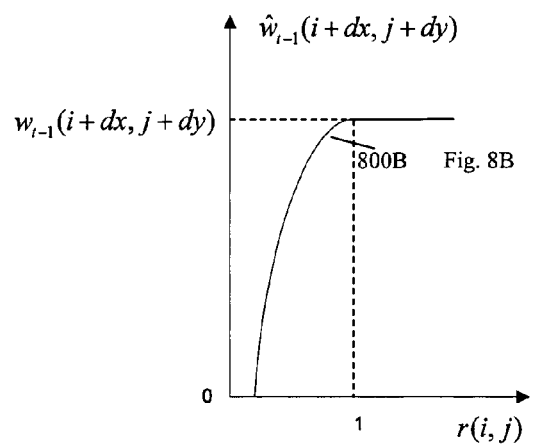
Figure 8C:
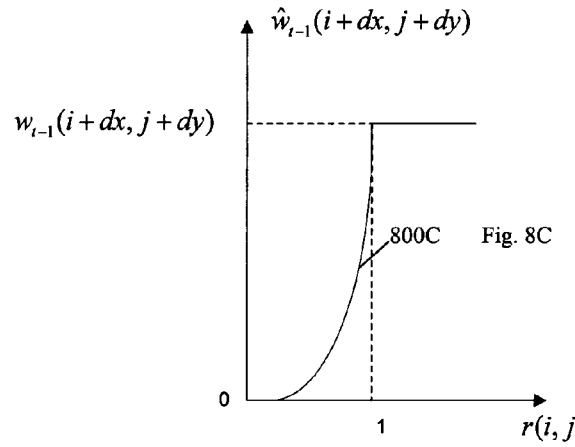
Figure 8D:
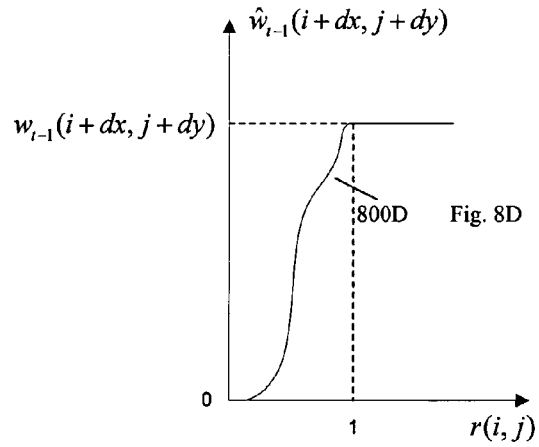

For example, FIG. 7 shows precise pixel tracking by motion estimation along temporal direction. Based on the Maximum Likelihood criteria, the optimal filtering result of the pixel $p_4$ is the average of the pixels $p_k$(k=0, 1, 2, 3, 4). Since the original pixels $p_k$(k=0, 1, 2, 3) are not available in filtering pixel $p_4$, another way to obtain the optimal filtering result is utilized. Specifically, setting the initial filtered pixel $\hat{p}_0 = p_0$, the recursive method of $\hat{p}_k = (p_k + k \cdot \hat{p}_{k-1})/(k+1)$ for (k=1, 2, 3, 4) can be applied to optimally filtering the pixel $p_4$. In implementation, the weight of the filtered pixel is stored into the memory 308 (FIG. 3) and updated once the filtering is done. Let the initial weight of pixel $p_0$ be $w_0=1$. The pixel $p_k$(k=1, 2, 3, 4) can be filtered by relations:

$$\hat{p}_k = (p_k + w_{k-1} \cdot \hat{p}_{k-1})/(w_{k-1}+1),$$

$$w_k = w_{k-1} + 1.$$

Based on the above analysis, let $w_{t-1}(i+dy,j+dx)$, and saved in the memory 308 (FIG. 3), be the associated weight of pixel $\hat{g}_{t-1}(i+dy,j+dx)$. That weight is adjusted in the weight adjustment unit 304 (FIG. 3) according to the reliability of motion vector. Denoting $\hat{w}_{t-1}(i+dy,j+dx)$ as the adjusted weight, FIGS. 8A-D show four examples of the implementation of the weight adjustment block 304. If the motion vector is not reliable (i.e., r(i,j)=0), $\hat{w}_{t-1}(i+dy,j+dx)$ is set to 0. If the motion vector is reliable (r(i,j)=1), then $\hat{w}_{t-1}(i+dy,j+dx)$ is set to $w_{t-1}(i+dy,j+dx)$. If the reliability value r(i,j) is in the middle of 0 and 1, $\hat{w}_{t-1}(i+dy,j+dx)$ can be linearly interpolated, as shown by example 800A in FIG. 8A, or non-linearly interpolated, as shown by examples 800B-D in FIGS. 8B-D, respectively, to output a smoothing result. There is no restriction on adjusting the weight except that $\hat{w}_{t-1}(i+dy,j+dx)$ is a monotonically increasing function of the reliability value r(i,j).

In the motion compensated temporal filtering unit 302 (FIG. 3), relation (1) below is used to obtain the final filtered output:

$$\hat{g}_t(i,j) = \frac{g_t(i,j) + \hat{w}_{t-1}(i+dy, j+dx) \cdot \hat{g}_{t-1}(i+dy, j+dx)}{\hat{w}_{t-1}(i+dy, j+dx) + 1}. \quad (1)$$

Thereafter, the corresponding weight is updated by relation (2) below:

$$w_t(i,j) = \hat{w}_{t-1}(i+dy,j+dx) + 1. \quad (2)$$

Setting the initial value $w_0(i,j)$ to 1, the filtered pixel and the updated weight are saved in the memory 308 and 310, respectively, for filtering the next incoming frame. Experiments by inventors have revealed that if the updated weight is too large, artifacts such as motion blurring will occur. Therefore, a maximum value $w_{max}$ is selected which can not be exceeded by the updated weight. The relation (2) thus is modified to relation (3) below:

$$w_t(i,j) = \min(w_{max}, \hat{w}_{t-1}(i+dy,j+dx) + 1). \quad (3)$$

The present invention can be used on both progressive and interlaced videos. The even and odd fields in an interlaced video can be processed as two separate progressive video sequences; or the fields can be merged into a single frame prior to be processed.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of reducing noise in a sequence of digital video frames, comprising the steps of:

estimating motion between a current noisy frame and a previous noise-reduced frame using a processor, to generate motion vectors indicating relative motion between the pixels in the current noisy frame and the corresponding pixels in the previous noise-reduced frame; and removing noise from the current noisy frame by computing the weighted average of pixels in the current noise frame and said corresponding pixels in the previous noise-reduced frame based on the motion vectors in the processor, to generate a noise-reduced output frame, wherein:

the step of estimating motion further includes the steps of estimating motion between a current noisy frame $g_t$ at time t and a previous noise-reduced frame $\hat{g}_{t-1}$, to generate a motion vector (dy,dx) for a pixel $g_t(i,j)$ in the frame $g_t$, such that the corresponding matching pixel in the previous noise-reduced frame $\hat{g}_{t-1}$ is $\hat{g}_{t-1}$ (i+dy,j+dx); and removing noise from the current noisy frame further comprises the steps of computing the weighted average further includes the steps of computing the weighted average of the pixel $g_t(i,j)$ in the frame $g_t$ and the pixel $\hat{g}_{t-1}(i+dy,j+dx)$ in the frames $\hat{g}_{t-1}$ to generate the noise-reduced output frame $\hat{g}_t$, wherein the step of generating the noise-reduced output frame $\hat{g}_t$ further comprises the steps of computing:

$$\hat{g}_t(i,j) = \frac{g_t(i,j) + \hat{w}_{t-1}(i+dy, j+dx) \cdot \hat{g}_{t-1}(i+dy, j+dx)}{\hat{w}_{t-1}(i+dy, j+dx) + 1},$$

and

-continued
$$w_t(i, j) = \min(w_{\max}, \hat{w}_{t-1}(i + dy, j + dx) + 1),$$

wherein (dy,dx) is the motion vector of the pixel $g_t(i,j)$;
$w_t(i,j)$ is the potential weight of $\hat{g}_t(i,j)$ in filtering the pixels in the next frame $g_{t+1}$ with an initial value $w_0(i,j)=1$;
$\hat{w}_{t-1}(i+dy,j+dx)$ is the associated weight of the pixel $\hat{g}_{t-1}(i+dy,j+dx)$ and also an adjustment of $w_{t-1}(i+dy,j+dx)$ as a function of reliability of the motion vector (dy,dx); and
$w_{max}$ is a threshold that the value $w_t(i,j)$ can not exceed.

2. The method of claim 1, wherein the step of estimating motion further includes the steps of performing motion estimation between the current noisy frame $g_t$ and the previous noise-reduced frame $\hat{g}_{t-1}$.

3. The method of claim 2 wherein the step of estimating motion between the current noisy frame $g_t$ and the previous noise-reduced frame $\hat{g}_{t-1}$ further includes the steps of applying extended motion estimation between $g_t$ and $\hat{g}_{t-1}$.

4. The method of claim 3 wherein the step of applying extended motion estimation between the current noisy frame $g_t$ and the previous noise-reduced frame $\hat{g}_{t-1}$ further includes the steps of:
searching the motion vector of a block of pixels in $g_t$ in a pre-defined searching area in $\hat{g}_{t-1}$;
searching the motion vector of said block in a local searching area in $\hat{g}_{t-1}$ if a previous matching position is located on the edge of the pre-defined searching area; and
iterating the local searching around the previous matching position until no better matching position is obtained.

5. The method of claim 1, further comprising the steps of estimating the reliability of the motion vector.

6. The method of claim 5 wherein:
the step of estimating the reliability of the motion vector further includes the steps of performing pixel-wise mean absolute error calculation between two local blocks centered at the pixels $g_t(i,j)$ and $\hat{g}_{t-1}(i+dy,j+dx)$, respectively, wherein (dy,dx) is the motion vector of the pixel $g_t(i,j)$; and
the pixel-wise reliability of the motion vector is determined as a function of the mean absolute error.

7. The method of claim 5 wherein:
if the motion vector (dy,dx) of the pixel $g_t(i,j)$ is non-reliable, then
$$\hat{w}_{t-1}(i+dy,j+dx)=0;$$
if the motion vector is reliable, then
$$\hat{w}_{t-1}(i+dy,j+dx)=w_{t-1}(i+dy,j+dx); \text{ and}$$
if the reliability of the motion vector is between non-reliable and reliable, then $\hat{w}_{t-1}(i+dy,j+dx)$ is determined by interpolation as a monotonically decreasing function of the reliability.

8. A noise reduction system for reducing noise in a sequence of digital video frames, comprising:
a motion estimator that estimates motion between a current noisy frame and a previous noise-reduced frame, to generate motion vectors indicating relative motion between the pixels in the current noisy frame and the corresponding pixels in the previous noise-reduced frame; and
a noise reducer that removes noise from the current noisy frame by computing the weighted average of pixels in the current noise frame and said corresponding pixels in the previous noise-reduced frame based on the motion vectors, to generate a noise-reduced output frame,
wherein:
the motion estimator estimates motion between a current noisy frame $g_t$ at time t and a previous noise-reduced frame $\hat{g}_{t-1}$, to generate a motion vector (dy,dx) for a pixel $g_t(i,j)$ in the frame $g_t$, such that the corresponding matching pixel in the previous noise-reduced frame $\hat{g}_{t-1}$ is $\hat{g}_{t-1}(i+dy,j+dx)$; and
noise reducer removes noise from the current noisy frame by computing the weighted average further includes the steps of computing the weighted average of the pixel $g_t(i,j)$ in the frame $g_t$ and the pixel $\hat{g}_{t-1}(i+dy,j+dx)$ in the frames $\hat{g}_{t-1}$ to generate the noise-reduced output frame $\hat{g}_t$,
wherein the noise reducer generates the noise-reduced output frame $\hat{g}_t$ by computing:

$$\hat{g}_t(i,j) = \frac{g_t(i,j) + \hat{w}_{t-1}(i+dy, j+dx) \cdot \hat{g}_{t-1}(i+dy, j+dx)}{\hat{w}_{t-1}(i+dy, j+dx) + 1},$$

and $$w_t(i,j) = \min(w_{\max}, \hat{w}_{t-1}(i+dy, j+dx) + 1),$$

wherein (dy,dx) is the motion vector of the pixel $g_t(i,j)$;
$w_t(i,j)$ is the potential weight of $\hat{g}_t(i,j)$ in filtering the pixels in the next frame $g_{t+1}$ with an initial value $w_0(i,j)=1$;
$\hat{w}_{t-1}(i+dy,j+dx)$ is the associated weight of the pixel $\hat{g}_{t-1}(i+dy,j+dx)$ and also an adjustment of $w_{t-1}(i+dy,j+dx)$ as a function of reliability of the motion vector (dy,dx); and
$w_{max}$ is a threshold that the value $w_t(i,j)$ can not exceed.

9. The system of claim 8 wherein the motion estimator farther applies extended motion estimation between $g_t$ and $\hat{g}_{t-1}$.

10. The system of claim 9 wherein the motion estimator applies the extended motion estimation between the current noisy frame $g_t$ and the previous noise-reduced frame $\hat{g}_{t-1}$ by:
searching the motion vector of a block of pixels in $g_t$ in a pre-defined searching area in $\hat{g}_{t-1}$;
searching the motion vector of said block in a local searching area in $\hat{g}_{t-1}$ if a previous matching position is located on the edge of the pre-defined searching area; and
iterating the local searching around the previous matching position until no better matching position is obtained.

11. The system of claim 8 further comprising a reliability estimator that estimates the reliability of the motion vector.

12. The system of claim 11 wherein the reliability estimator estimates the reliability of the motion vector by performing pixel-wise mean absolute error calculation between two local blocks centered at the pixels $g_t(i,j)$ and $\hat{g}_{t-1}(i+dy,j+dx)$, respectively, wherein (dy,dx) is the motion vector of the pixel $g_t(i,j)$, and the pixel-wise reliability of the motion vector is determined as a function of the mean absolute error.

* * * * *